United States Patent
Bailey et al.

[11] Patent Number: 6,083,337
[45] Date of Patent: Jul. 4, 2000

[54] METHOD AND APPARATUS FOR BONDING A TRIM COVER TO A FOAM PAD ALONG A CONVEYOR ASSEMBLY LINE

[75] Inventors: Robert Bailey, Waterford; Scott Barber, Allen Park; John Sapielak, Dearborn Hts.; Ron Monk, Farmington Hills; Dennis Sosnowski, Northville; Raymond Ormachea, Fraser; Brian Scholfield, Canton; Don Hamilton, Waterford, all of Mich.

[73] Assignee: Lear Corporation, Southfield, Mich.

[21] Appl. No.: 09/099,976

[22] Filed: Jun. 19, 1998

Related U.S. Application Data

[60] Provisional application No. 60/089,434, Jun. 16, 1998.

[51] Int. Cl.[7] ............................................. B65H 5/09
[52] U.S. Cl. ..................... 156/212; 156/475; 156/556; 156/566; 156/581; 156/583.8; 425/345; 425/411
[58] Field of Search .................... 156/475, 212, 156/566, 556, 362, 352, 359, 581, 583.8, 583.6; 198/343.1, 577, 952; 425/353, 354, 345, 411, 409

[56] References Cited

U.S. PATENT DOCUMENTS

| | | |
|---|---|---|
| 6,933 | 12/1849 | Brown . |
| 1,506,149 | 8/1924 | Beadle . |
| 2,197,528 | 4/1940 | Makenny ................................. 18/17 |
| 4,221,626 | 9/1980 | Clay ..................................... 156/366 |
| 4,441,949 | 4/1984 | Kiss ...................................... 156/212 |
| 4,692,199 | 9/1987 | Kozlowski et al. . |
| 4,722,653 | 2/1988 | Williams et al. . |
| 4,764,241 | 8/1988 | Makino . |
| 4,929,304 | 5/1990 | Urai et al. . |
| 4,997,507 | 3/1991 | Meyer . |
| 5,073,099 | 12/1991 | Kayano ................................. 425/125 |
| 5,238,513 | 8/1993 | Gill ........................................ 156/64 |
| 5,254,197 | 10/1993 | Klems . |
| 5,271,490 | 12/1993 | Sticht . |
| 5,372,668 | 12/1994 | Bracesco . |

*Primary Examiner*—Jeff H. Aftergut
*Assistant Examiner*—Gladys Piazza
*Attorney, Agent, or Firm*—MacMillan, Sobanski & Todd

[57] ABSTRACT

An assembly for use in bonding an trim cover to a foam pad along a pair of conveyor line in a process of a plurality of stations. A plurality of tool carriers are transported along each of the conveyor lines to each station. The tool carrier supports at least one mold assembly for bonding an air impervious adhesive film between the cover and the foam pad. A collar assembly pivotally supports a press platen above the mold assembly and provides pivotal movement between an open position spaced at a predetermined angle above the mold assembly and a closed position compressing the foam pad against the trim cover and mold assembly. The tool carrier includes a pair of vacuum inlet connectors for engagement by a vacuum snorkel to provide vacuum pressure to the mold assembly and travel with the tool carrier along the conveyor line between consecutive process stations. The tool carrier also includes a pair of heat connectors and a second dirty vacuum connector which are engaged at several stations by heat snorkels and a vacuum snorkel, respectively, to provide heat to the mold assembly for melting the adhesive and then dirty vacuum pressure to cure the bond between the trim cover and foam pad. A striker assembly is positioned above the tool carrier at two different process stations for pivoting and locking the press platen between the open and closed positions.

43 Claims, 12 Drawing Sheets

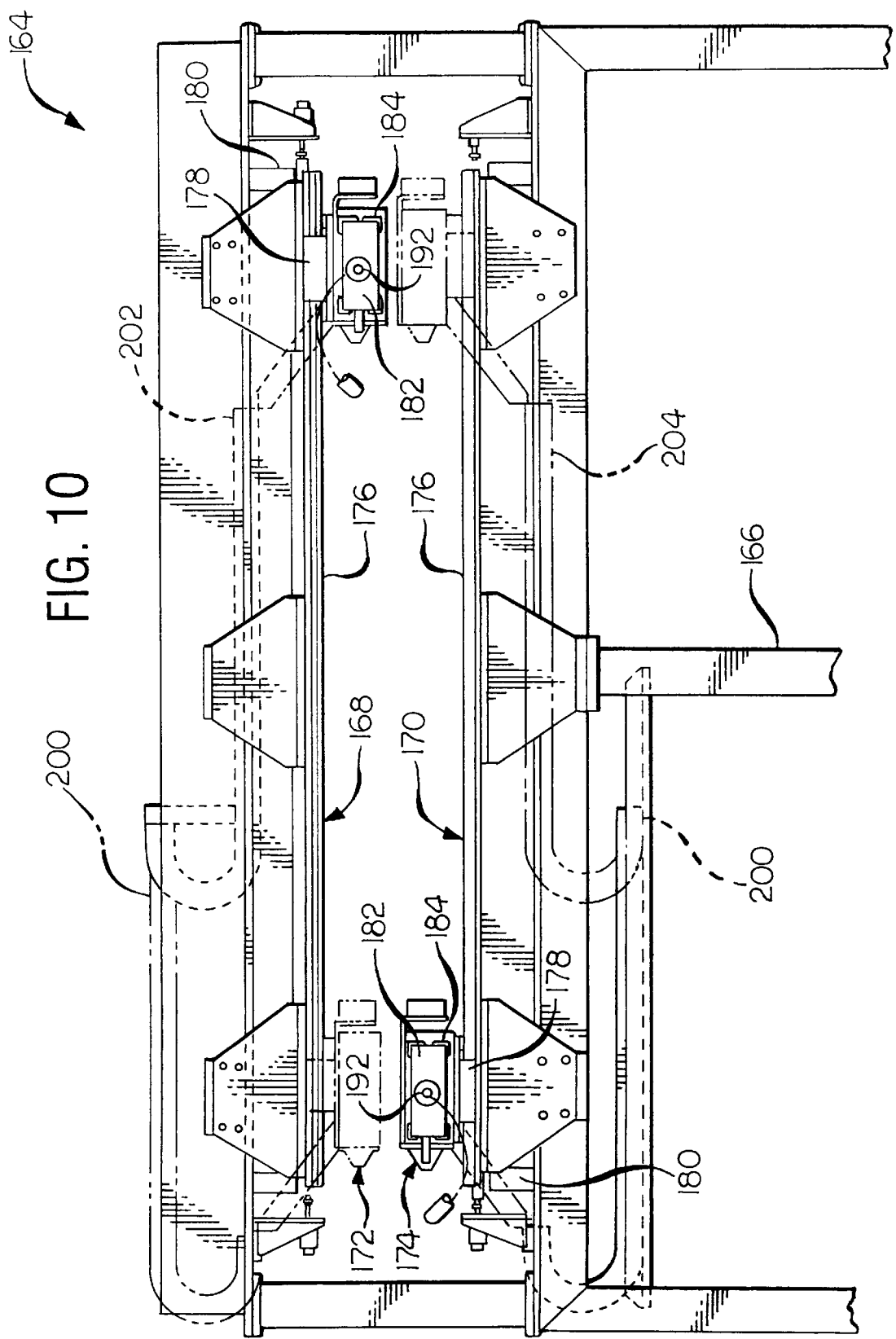

METHOD AND APPARATUS FOR BONDING A TRIM COVER TO A FOAM PAD ALONG A CONVEYOR ASSEMBLY LINE

This application claims benefit of U.S. Provisional application Ser. No. 60/089,434, filed Jun. 16, 1998.

TECHNICAL FIELD

The subject invention relates to the securing and bonding of a fabric or cloth trim cover to a cellular foam pad of the type utilized for seating and back cushions on automotive seats.

BACKGROUND OF THE INVENTION

A great amount of development activity has occurred to eliminate the labor intensive methods of wrapping a cloth fabric or trim cover about a contoured cellular foam pad for use in automotive seating applications.

One such development is disclosed in U.S. Pat. No. 4,692,199 to Kozlowski et al., issued Sep. 8, 1997 and assigned to the current assignee. This patent employs a method and apparatus for fabricating a cushion assembly wherein a fabric layer and air impervious adhesive film are placed over a mold surface. A vacuum is applied over the mold surface through the fabric layer to draw the adhesive film against the fabric layer and mold surface. A cellular foam pad is then placed against the adhesive film and compressed by an upper press platen and heated to defuse the adhesive film into the foam pad and fabric layer respectively.

The apparatus includes a single station including a mold presenting the mold surface having passages therein for establishing fluid communication with the mold surface and a vacuum for supplying vacuum pressure to the mold. The apparatus further includes a heating source for supplying heated fluid through the mold and a press platen moveable relative to the mold surface for compressing the foam pad against the mold surface with the fabric layer and adhesive film sandwiched therebetween.

However, these prior activities provide only a single apparatus and method for fabricating a single seat cushion or back cushion in any one method of operation. Thus, there remains the desire to provide a method and apparatus for fabricating and bonding a trim cover to a foam pad along a conveyer assembly line process including various stages in the process and equipment for fabricating seat assemblies in a continuous multi-stage process.

SUMMARY OF THE INVENTION

An assembly for use in bonding a trim cover to a cellular foam pad comprising a tool carrier including a support plate for supporting at least one mold assembly. The mold assembly includes a contoured upper mold surface for supporting the trim cover and foam pad. A press platen is supported by the support plate above the mold assembly for compressing the foam pad against the trim cover and upper mold surface. A collar assembly pivotally supports the press platen and providing pivotal movement of the press platen between an open position spaced at a predetermined inclined angle above the mold assembly and a generally horizontal position adjacent the upper mold surface. At least one slide rod extends generally vertically from the support plate and slidably couples to the press platen for providing vertical movement of the press platen from the horizontal position to a closed position compressing the foam pad against the trim cover and upper mold surface. A conveyor line having a plurality of driven rollers for supporting and transporting the tool carrier between one of several assembly stations and a striker assembly is positioned above the tool carrier in one of the assembly stations. The striker assembly includes a cylinder assembly supporting a striker plate for providing movement of the striker plate between a raised position spaced above the tool carrier and a lowered position engaging the press platen and moving the press platen from the open position to the closed position.

FIGURES IN THE DRAWINGS

Other advantages of the present invention will be readily appreciated as the same becomes better understood by reference to the following detailed description when considered in connection with the accompanying drawings wherein:

FIG. 10 is a front view of the vacuum assembly and connecting boxes;

DESCRIPTION OF THE PREFERRED EMBODIMENT

Figure 1:
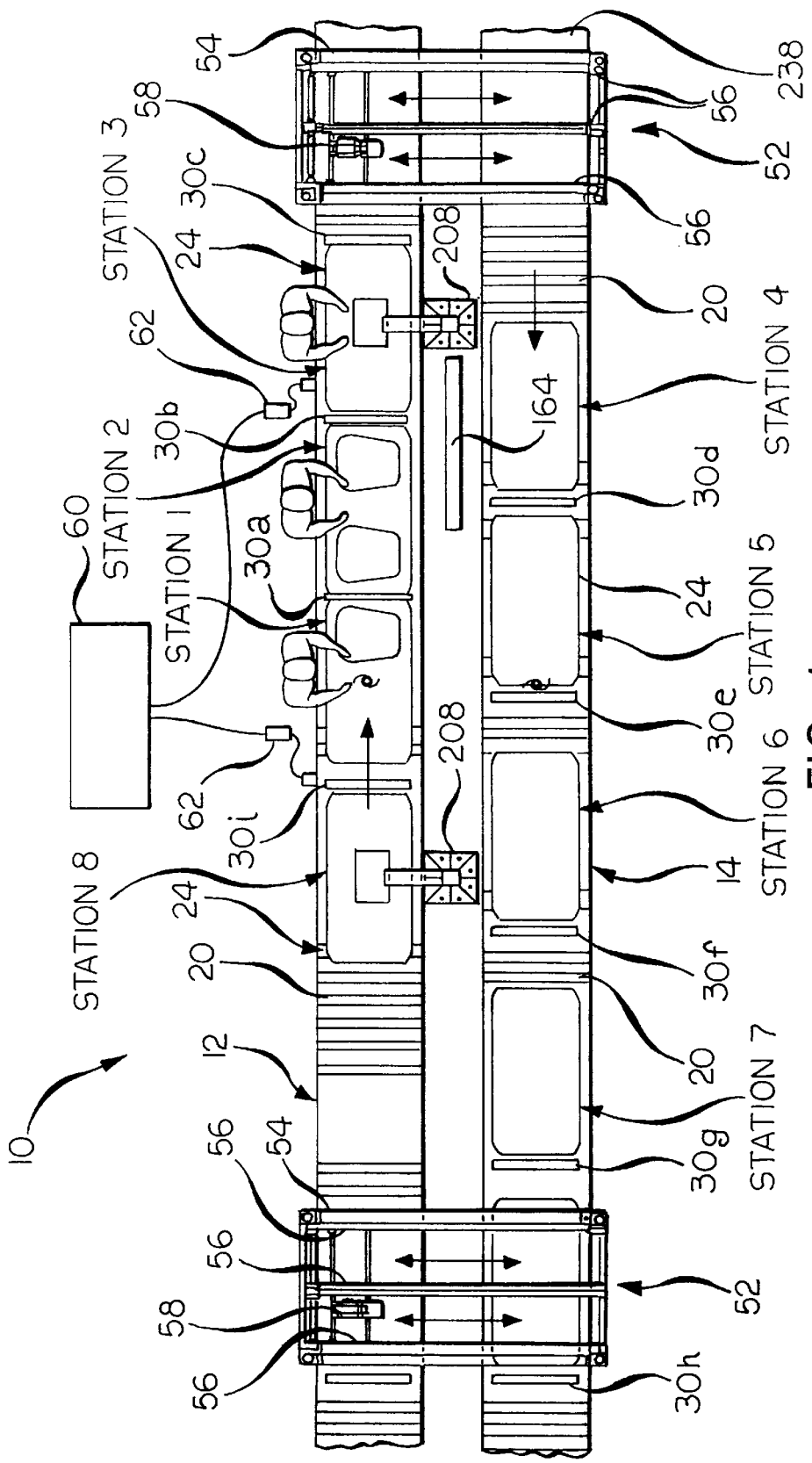
FIG. 1 is a schematic environmental view of the subject invention assembly line and process stations.

Referring to the Figures, wherein like numerals reference like or corresponding parts throughout the several views, a conveyer assembly line and plurality of seat bonding apparatus' according to the subject invention are generally shown at 10 in FIG. 1. The conveyer assembly line in the preferred embodiment includes a pair of parallel, longitudinally extending first and second conveyor lines shown at 12 and 14. Each conveyor line 12,14 is elevated above the floor and comprises opposing side support rails 16,18 forming a guide track and supporting a plurality of rollers 20 transversely therebetween. The rollers 20 in the preferred embodiment are intercoupled by a drive belt and driven by a belt and motor assembly as shown at 22 in FIG. 8, however, the rollers 20 may be driven by any power drive system commonly known to those skilled in the art. The rollers 20 of each conveyor line 12, 14 support a plurality of substantially similar tool carrier assemblies, shown schematically in FIG. 1 at 24, and transfer each tool carrier 24 longitudinally along the conveyor lines 12, 14.

Figure 2:
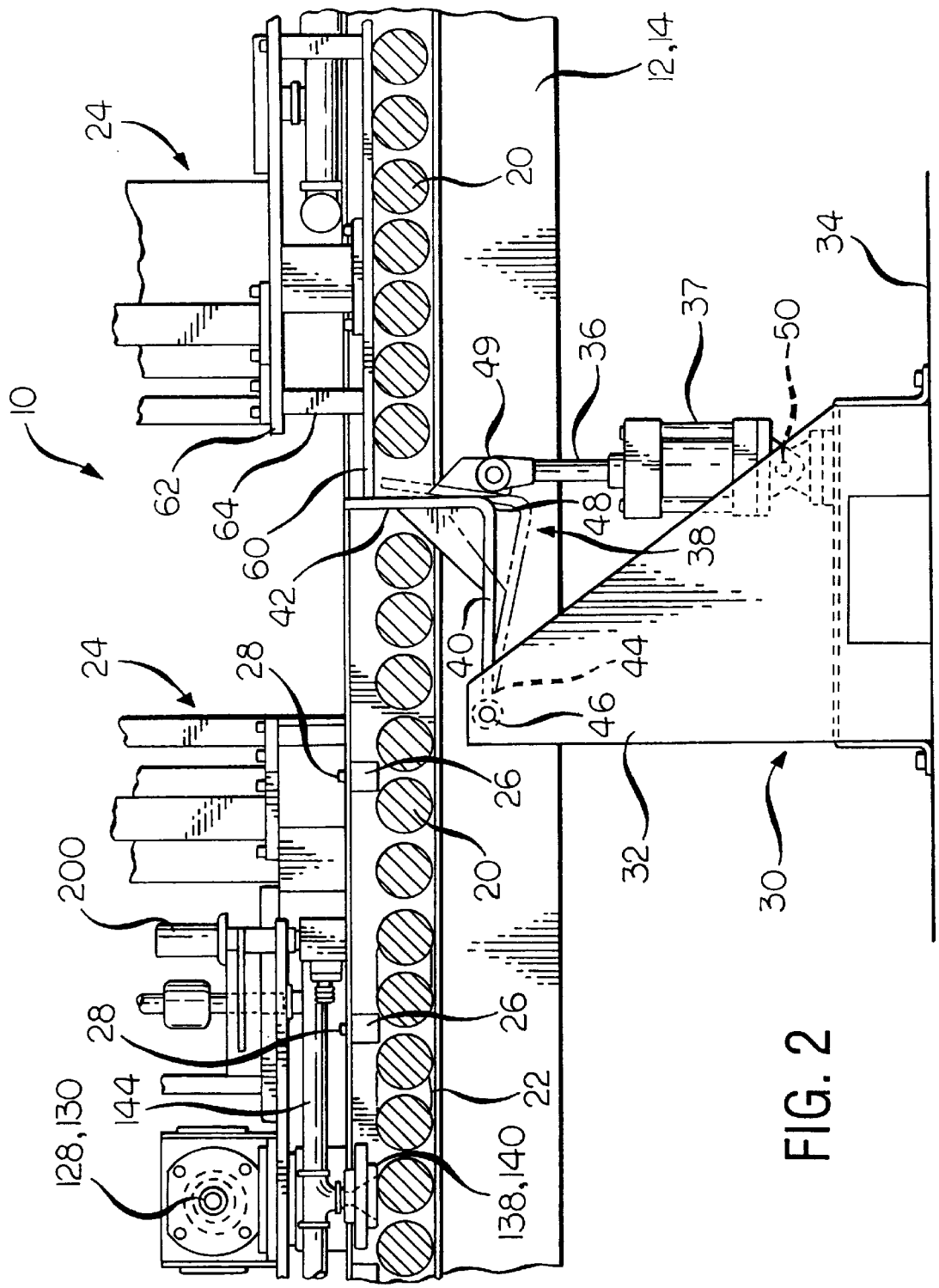
FIG. 2 is a partially broken side view of the conveyor line and locator assembly engaging a tool carrier.
Figure 8:
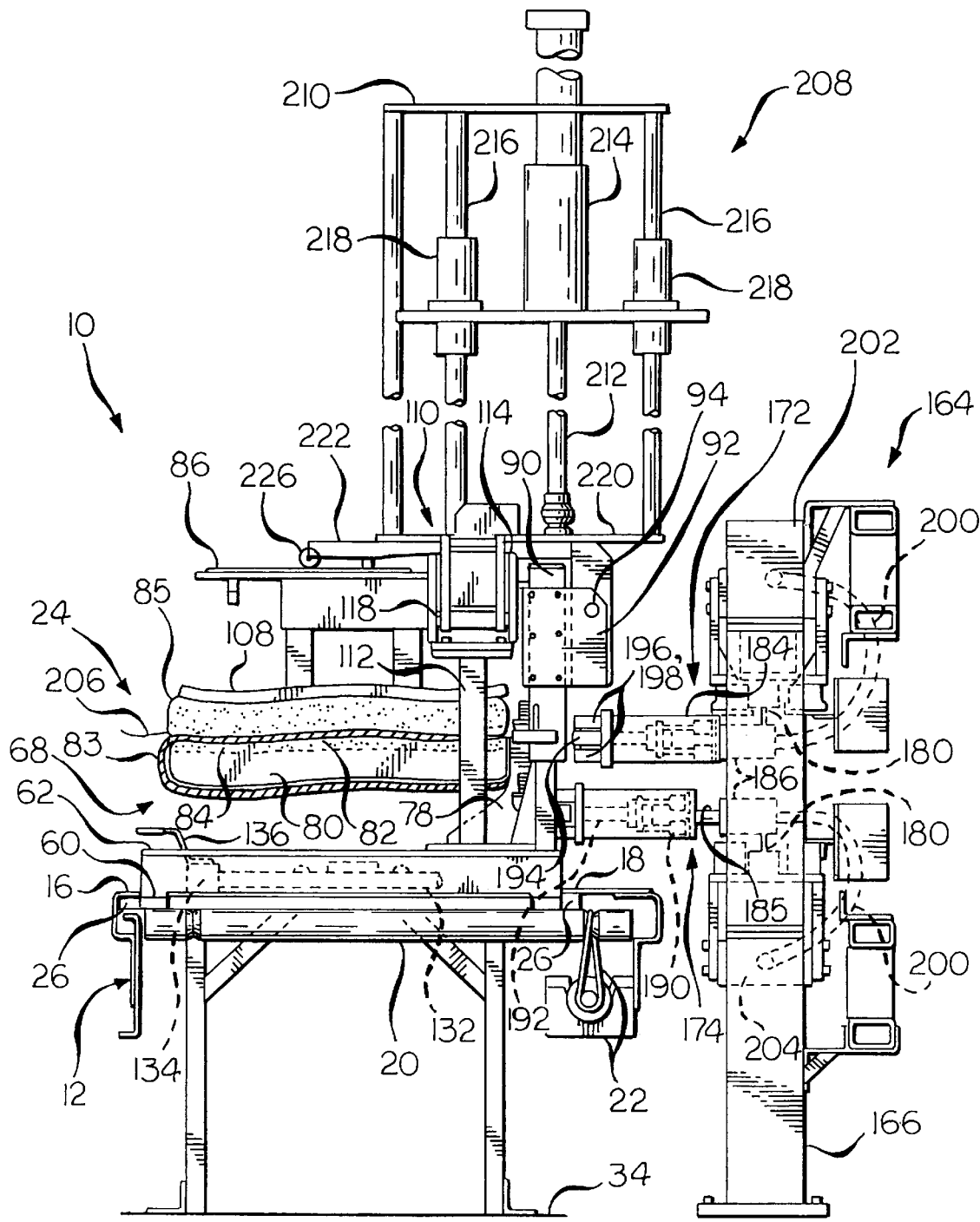
FIG. 8 is a side view of the tool carrier on the conveyor line in station 3.

Referring to FIGS. 2 and 8, each conveyor line 12,14 further includes a plurality of spaced apart alignment wheels 26 secured to the opposing side rails 16, 18 by a pivot pin 28 for providing rolling engagement with opposing sides of the tool carriers 24 to align each carrier 24 along the rollers 20 in equal distance between the side rails 16, 18.

A plurality of tool carrier locators 30 are positioned beneath each conveyor line 12, 14 for engaging, stopping and locating each of the tool carriers 24 in a predetermined position along either of the conveyor lines 12, 14 for any given manufacturing process. As shown in FIG. 2, the locator 30 includes a base member 32 secured to the assembly floor 34 for vertically supporting a hydraulic or pneumatic piston 36 and cylinder 37 assembly and a bumper plate 38. The bumper plate 38 includes a generally horizontal long leg 40 and a generally vertical short leg 42 forming an L-shaped configuration. The long leg 40 includes a first proximal end 44 pivotably connected at 46 to the upper portion of the base member 32 and a second distal end 48 pivotally coupled to the distal end of the piston 36 at 49. The short leg 42 extends upwardly from the distal end 48 of the long leg 40. The cylinder 37 is pivotally coupled to the base member at 50 and pivots the bumper plate 38 about the first end 44 of the long leg 40 between a lowered position spaced below the rollers 20 of the conveyor line 12, 14 and a raised position extending the short leg 42 between adjacent rollers 20 along the conveyor line 12, 14 and above the surface of the rollers 20 for engaging, stopping and locating a tool carrier 24 in a predetermined position along the conveyor line 12, 14. Obviously, the locators 30 may be positioned at various locations or intervals below and along the conveyor lines 12, 14 depending on the desired stopping location of the tool carriers 24.

Referring again to FIG. 1, the conveyor lines 12, 14 are intercoupled in the parallel relationship along opposite longitudinal ends by a conveyor transfer assembly 52. The transfer assembly 52 is mounted below the rollers 20 of the conveyor lines 12,14 and extends therebetween. Each transfer assembly 52 includes a frame 54 supporting a plurality of rolling tracks 56 arranged transverse to the direction of the rollers 20. At least one hydraulic or pneumatic piston and cylinder assembly 58 interconnects the rolling tracks 56 and the frame 54 and moves the tracks 56 between a lowered position below the rollers 20 of the conveyor lines 12, 14 and a raised position extending partially above the surface of the rollers 20. The rolling tracks 56 extend between the spaced apart pair of conveyor lines 12, 14 and are powered to rotate transverse to the rotational direction of the rollers 20 for lifting a tool carrier 24 above the surface of the rollers 20 and transferring the tool carrier 24 from one conveyor line 12 to the other conveyor line 14.

Each of the conveyor lines 12, 14 including the rollers 20, locators 30 and transfer assembly 52 may be automatically controlled between a powered state and a non-powered state by an automated controller 60 which may be interconnected to electrical controls on the conveyor lines 12, 14 or via a start/stop foot control peddle as shown at 62 in FIG. 1. The controller 60 may be programmed as desired for automating the conveyor lines 12, 14, locators 30 and transfer assembly 52 depending on the desired location and time sequence at the numerous stages cooperating with the tool carriers 24 along the lines 12, 14. The controller 60 may also reduce the speed of the rollers 20 upon approaching the locators 30 to assist in stopping and locating the carrier 24 in the desired station. The conveyor assembly lines 12, 14 including the rollers 20, alignment wheels 26, locators 30, and transfer assembly 52 are available from Rapistan Demag Corp. in Farmington Hills, Mich.

Figure 3:
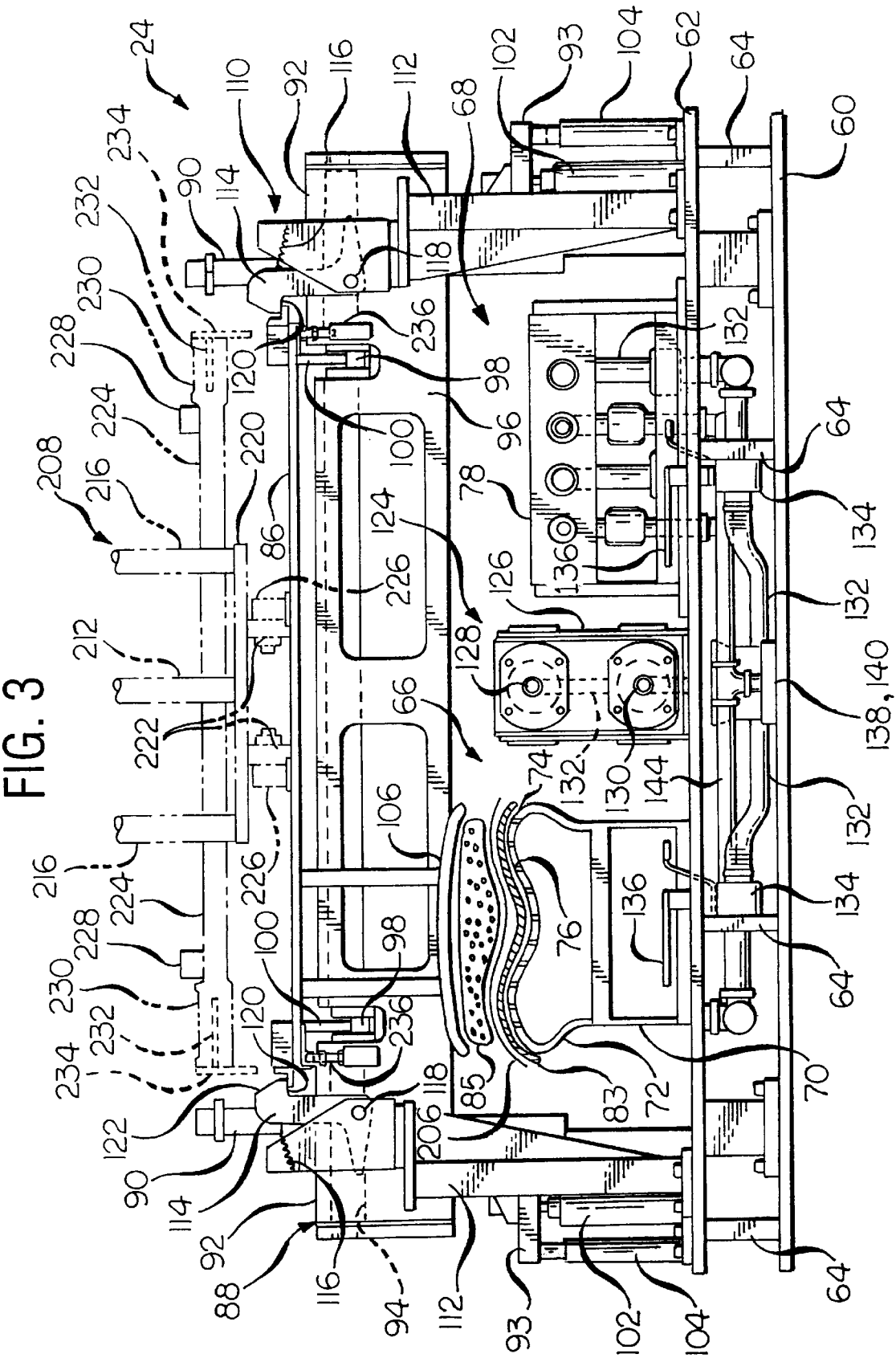
FIG. 3 is a front view of a tool carrier with the striker assembly shown in phantom.
Figure 4:
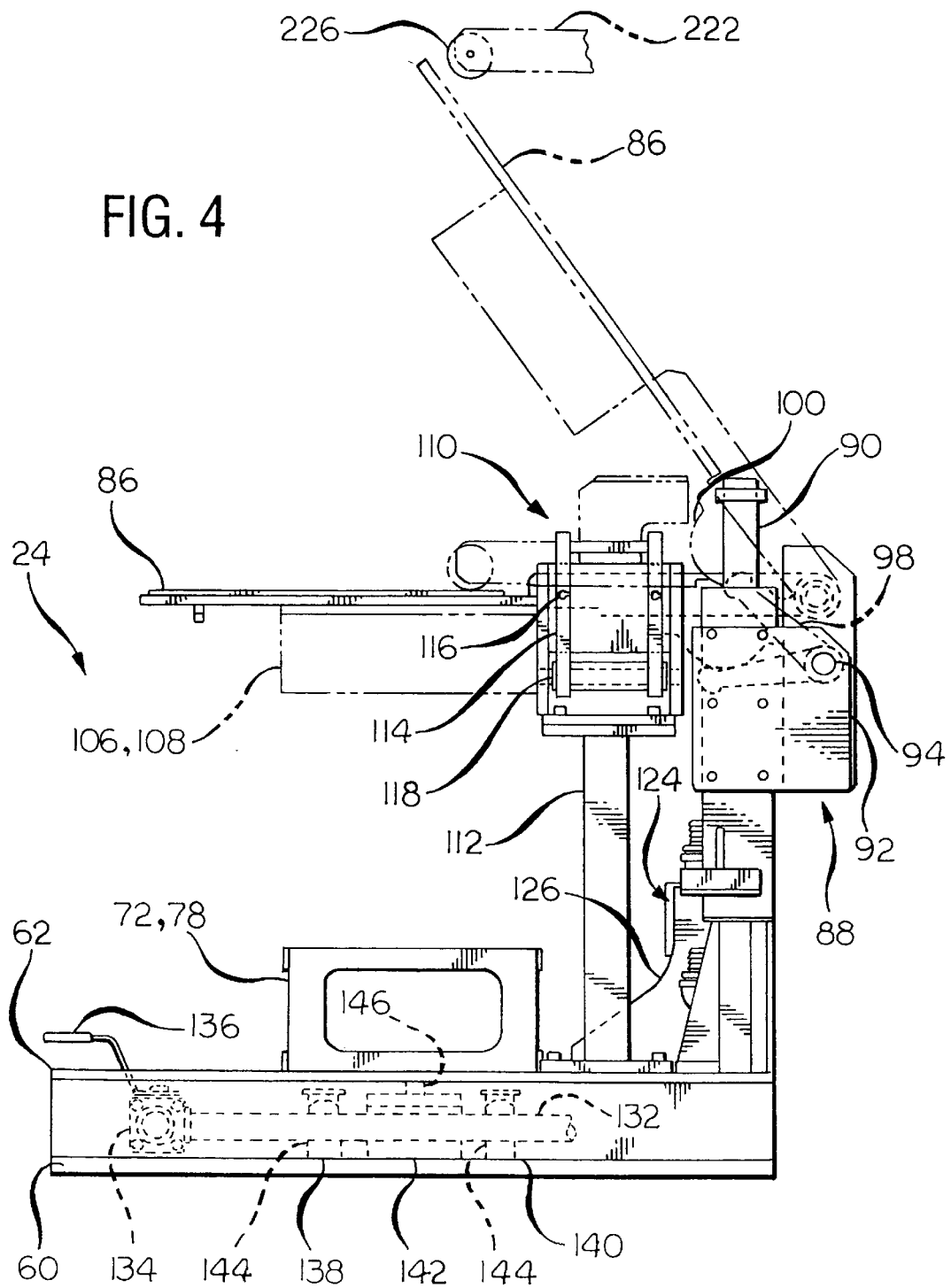
FIG. 4 is a side view of the tool carrier with the press platen shown in the open and closed positions.
Figure 5:
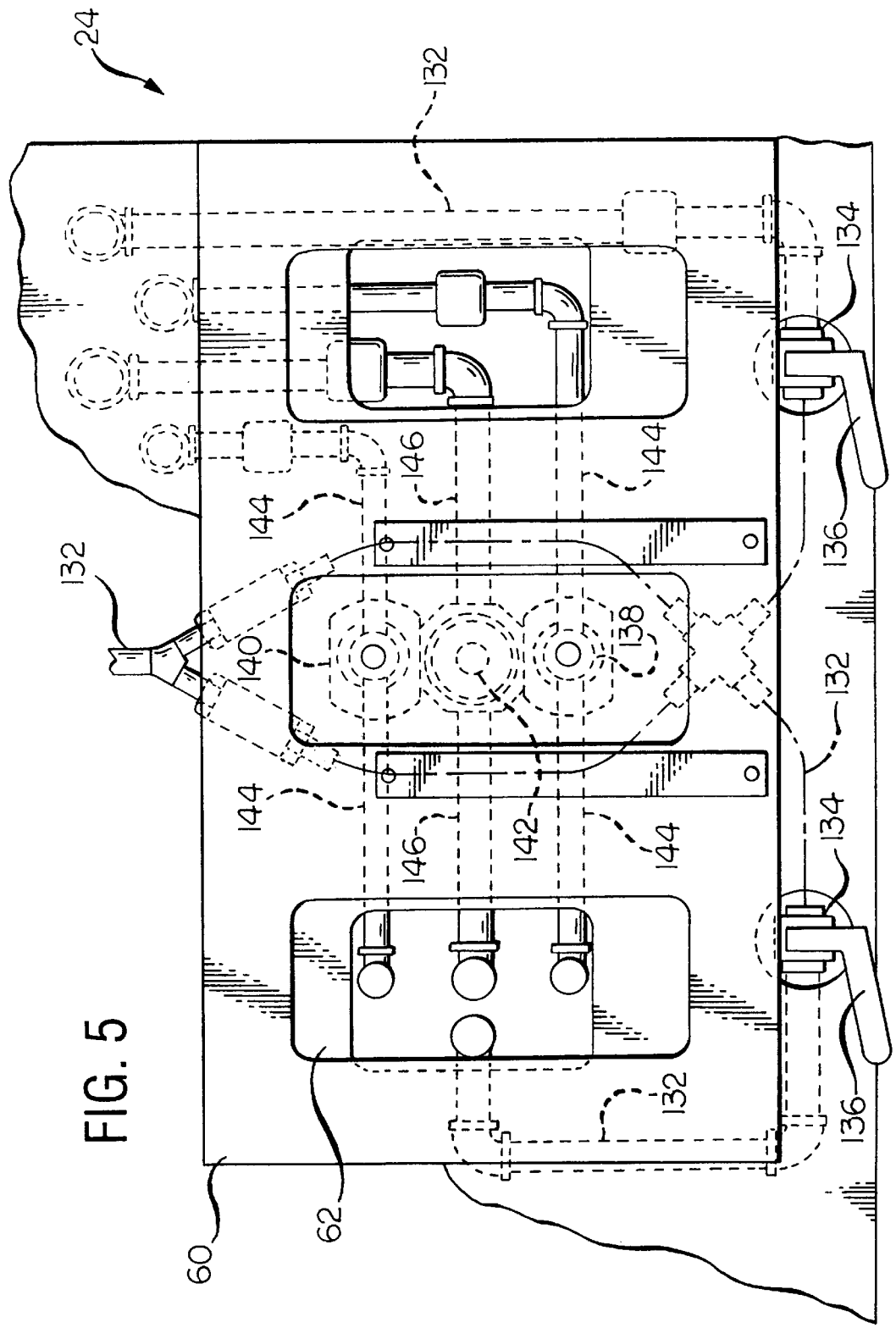
FIG. 5 is a fragmentary top view of the tool carrier showing the heat and vacuum connectors and fluid lines.
Figure 6:
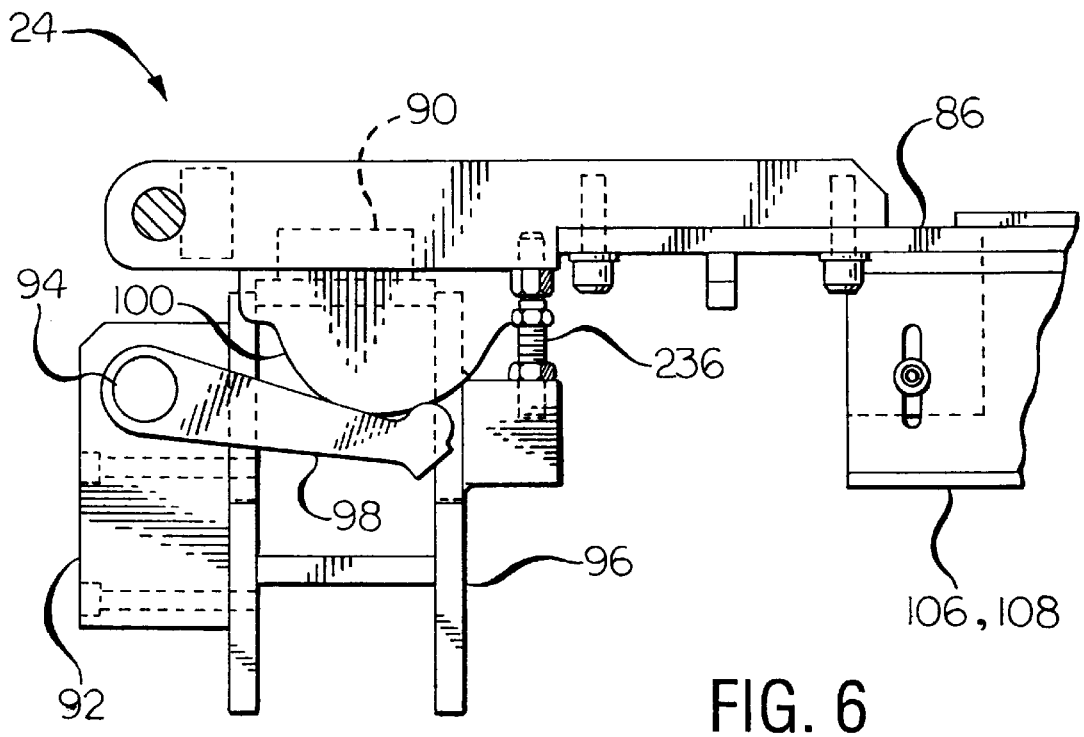
FIG. 6 is a fragmentary side view of the torsion bars and cam lobes for opening the press platen.

Referring to FIGS. 3, 4 and 5, a tool carrier according to the preferred embodiment is generally depicted at 24. The tool carrier 24 includes a generally rectangular lower support plate 60 supported by the rollers 20 along each of the conveyor lines 12, 14. A secondary support plate 62 is spaced above the lower support plate 60 and connected thereto by a plurality of vertical support posts 64. The secondary support plate 62 is capable of supporting either a single mold assembly for fabrication of a bench type seat cushion or seat back and also capable of supporting and mounting a pair of mold assemblies for either a single seat cushion, seat back or any combination or pair of same. By way of illustrative purposes only, the preferred embodiment discloses the secondary support plate 62 supporting a first mold assembly 66 for a seat cushion and a second mold assembly 68 for a seat back cushion. As shown in FIG. 3, the seat cushion mold assembly 66 comprises a generally rectangular lower mold support platen 70 fixedly secured to the secondary support plate 62 and supporting a contoured seat cushion lower mold 72 presenting an upper mold surface 74 having passages 76 therein for establishing fluid communication with the upper mold surface 74. The mold 72 is preferably made of a metallic material into a rigid porous structure having a relatively smooth surface. As shown in FIGS. 3 and 8, the seat back mold assembly 68 similarly includes a lower mold support platen 78 fixedly secured to the secondary support plate 62 and extending upwardly therefrom for supporting a contoured seat back lower mold 80 in a cantilevered fashion extending above and parallel to the secondary support plate 62. The seat back lower mold 80 similarly includes an upper mold surface 82 having passages 84 therein for establishing fluid communication with the upper mold surface 82 and is also made of a metallic material into a rigid porous structure having a relatively smooth surface. Each of the seat cushion and seat back mold surfaces 74, 82 are configured for receiving and supporting the A-surface or front face of a seat trim cover 83 and foam pad 85 as shown in FIG. 8 and as will be described in further detail hereinbelow.

Also included is a press platen or pressing fixture 86 suspended from a support frame structure 88 for providing pivotal and vertical movement relative to the molds 66, 68 for compressing the foam pad 85 against the respective lower mold assembly 66, 68. The support frame structure 88 is fixedly secured to the secondary support plate 62 and extends vertically thereabove for pivotably supporting the press platen 86 above each of the seat cushion 66 and seat back 68 lower mold assemblies. The support frame structure 88 includes a pair of slide rods 90 spaced apart on opposite ends of the press platen 86 for allowing vertical movement of the press platen 86 relative to the lower mold assemblies 66, 68. A collar assembly 92 is movably secured to each of the slide rods 90 for vertical movement therealong and the press platen 86 is pivotally coupled between each of the collars 92 by a pivot rod 94. The collars 92 are interconnected by a support beam 96 to provide rigidity therebetween. The pivot rod 94 supports a plurality of spring bias torsion bars 98 which interact with respective cam lobes 100 supported by the press platen 86 for urging the press platen 86 to pivot in a clockwise direction. The collars 92 and pivot rod 94 enable the press platen 86 to move between an open position as shown in FIG. 4 with the press platen 86 raised upwardly and angled relative to the secondary support plate 62 spaced away from each of the lower mold assemblies 66, 68 to provide access thereto and a closed position as shown in FIGS. 3 and 8, with the press platen 86 in a generally horizontal position spaced above and parallel to the secondary support plate 62 for compressing the foam pad 85 against each of the mold surfaces 74, 82.

A pair of nitrogen gas filled piston and cylinder assemblies 102 are mounted to the secondary support plate 62 along opposite ends of the collars 92 and engage an extension 93 on the bottom of each collar 92 for urging the collars 92, and thus, the press platen 86, vertically to the horizontal position. A pair of blocking members 104 are also spaced on opposite sides of the secondary support plate 62 beneath each collar extension 93 for abutting with the lower surface of each collar 92 and preventing vertical movement beyond a predetermined downward position in the closed position.

The press platen 86 further supports either a single upper mold assembly for a bench type seat assembly or a pair of seat cushion or seat back or combination thereof mold assemblies configured to conform to the B-surface or backside of the foam pad supported by each of the lower mold assemblies. The preferred embodiment of FIGS. 3 and 8 illustrate a seat cushion 106 and seat back 108 upper mold assembly.

The secondary support plate 62 further supports a locking mechanism 110 for locking the press platen 86 in the closed position. The locking mechanism 110 includes a pair of support towers 112 extending upwardly from the secondary support plate 62 on opposite sides of the press platen 86. The upper end of each tower 112 includes a hook member 114 pivotally attached thereto and spring bias toward the press platen 86 by connection of a coil spring 116 between the hooks 114 and tower 112. The hook members 114 include an upstanding member having one end pivotally connected to the support tower at 118 and a distal end forming a hook. The hook 114 comprises an outwardly projecting lip 120 for engaging the upper surface of the press platen 86 and locking the platen 86 in the closed position. The hook 114 also includes an upper cam surface 122 which is contacted by the side edge of the press platen 86 upon movement from the open to closed position against the biasing force of the spring 116 until the platen 86 passes beyond the lip 120 of the hook 114 and is retained in the closed position.

Still further, each of the tool carriers 24 includes a vacuum connection assembly 124 for providing a vacuum pressure to each of the upper mold surfaces 74, 82. The vacuum assembly 124 includes a single support plate 126 extending upwardly from the secondary support plate 62 between and behind each of the lower mold assemblies 66, 68 for housing a pair of vacuum inlet connectors 128, 130. As shown in FIGS. 3 and 5, a vacuum fluid 132 extends from each of the vacuum connectors 128, 130 and is routed through the space provided between the lower support plate 60 and the secondary support plate 62 to each of the seat cushion 72 and seat back 80 molds for simultaneously providing vacuum pressure through the passages 76, 84 in the upper mold surfaces 74, 82. Each branch of the vacuum line 132 communicates with the respective molds 72, 80 and includes a shutoff valve 134 and lever 136 for manually opening and closing the vacuum line 132 which provides the vacuum source to either of the mold surfaces 74, 82. The connection and operation of the vacuum 124 will be described in further detail hereinbelow.

Finally, the tool carrier 24 also includes a pair of heated fluid connectors 138, 140 and a second or dirty vacuum connector 142 seated in the lower support plate 60. The heated fluid connectors 138, 140 include a pair of spaced apart female inlet connectors mounted to the underside of the lower support plate 60 between the lower mold assemblies 66, 68. A fluid line 144 is connected to each of the connectors 138, 140 and routed along the space between the lower 60 and secondary support plates 62 to the respective seat cushion 66 and seat back 68 mold assemblies for providing heated fluid through the passages 76, 84 in the upper mold surfaces 74, 82. The heated fluid may be steam or hot air. Similarly, the dirty vacuum connector 142 includes a female inlet connector mounted to the lower support plate 60 between the pair of heated fluid connectors 138, 140 and includes a fluid line 146 connected therethrough between the lower 60 and secondary 62 support plates and branching off to each of the lower mold assemblies 66, 68 to simultaneously provide a vacuum source to each of the upper mold surfaces 74, 82.

Figure 13:
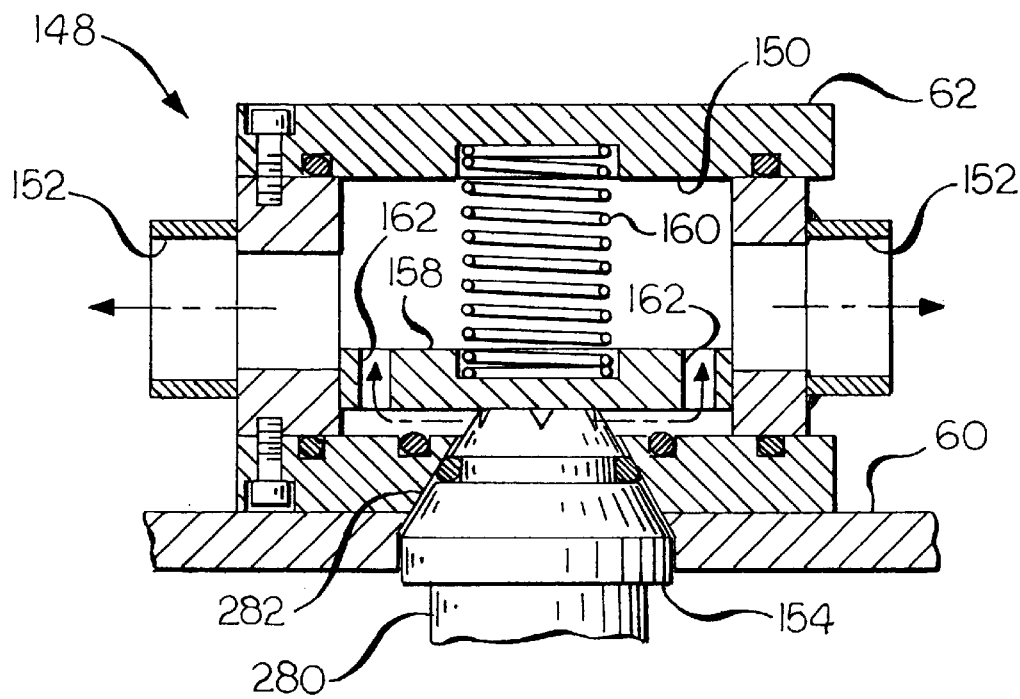
FIG. 13 is a cross-sectional view of the dirty vacuum snorkel and connecting valve.
Figure 7:
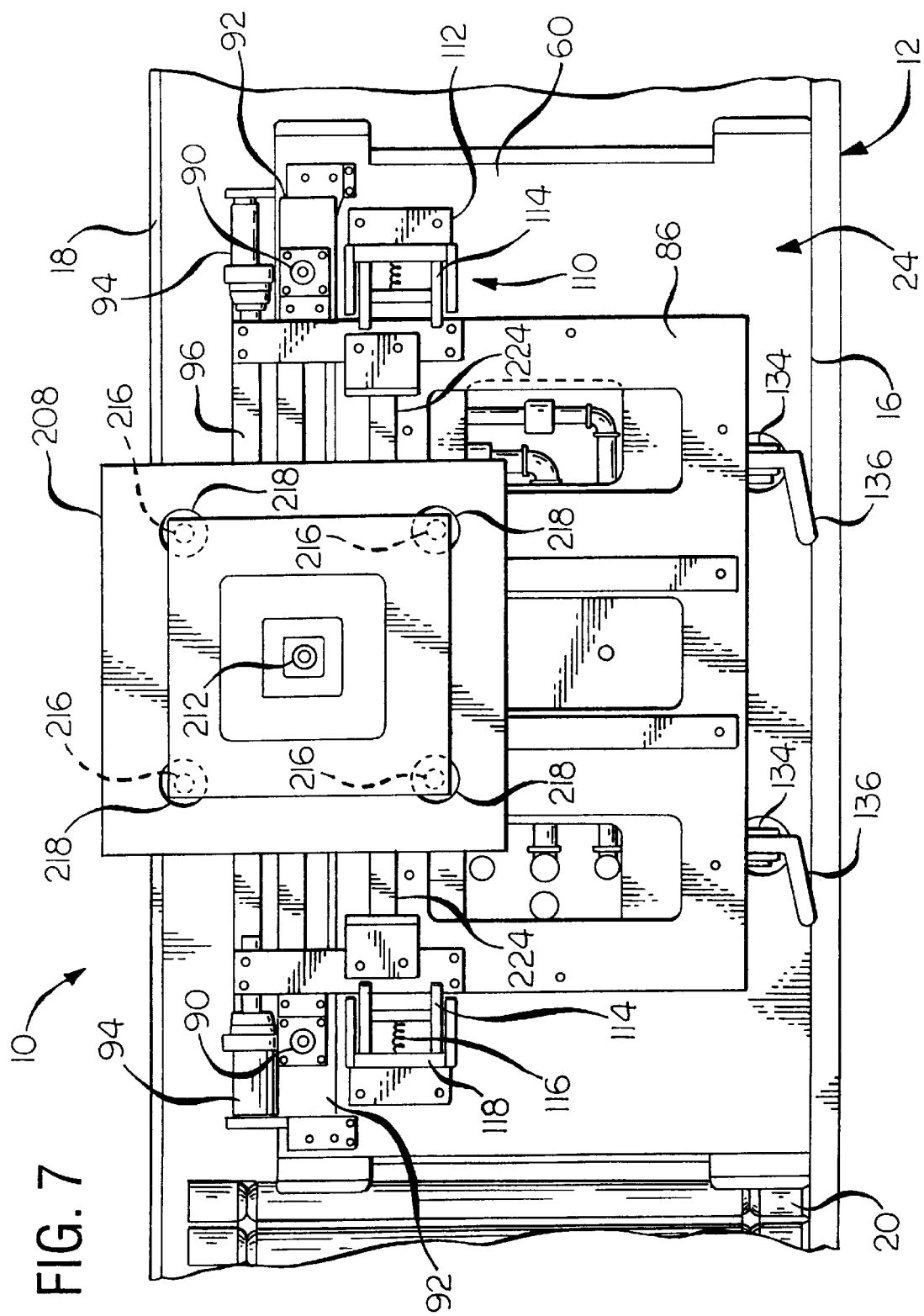
FIG. 7 is a top view of the tool carrier positioned beneath a striker assembly.

As shown in FIG. 13, the dirty vacuum connector 142 includes a check valve 148 for selective opening and closing the vacuum connector 142 for providing selective passage of steam or vacuum pressure through the fluid lines to the mold assemblies 66, 68. More specifically, the check valve 148 includes a fluid chamber 150 between the lower 60 and secondary 62 support plates having a pair of opposing outlets 152 to the dirty vacuum fluid lines 146. The lower support plate 60 includes an opening forming an inlet 154 into the fluid chamber 150 and for receiving a dirty vacuum snorkel 280 as will be described in further detail hereinbelow. A cylindrical floating blocking valve 158 is seated in the fluid chamber 150 and bias toward the inlet 154 by a coil spring 160. The blocking valve 158 includes a plurality of passageways 162 therethrough to allow passage of vacuum pressure into the chamber 150 and fluid lines 146. In operation, when the snorkel 280 is received into the inlet 154, the blocking valve 158 is lifted upwardly in the chamber 150 and away from the lower support plate 60 to open the passageways 162 and allow passage of vacuum pressure through the fluid lines 146. Once the snorkel 280 is removed from the inlet 154, the spring 160 presses the blocking valve 158 against the lower support plate 60 to close the inlet 154 and the passageways 162 to prevent the backflow of heated fluid or steam from passing through the fluid lines 146 and out of the inlet 154 from the tool 24.

Figure 14:
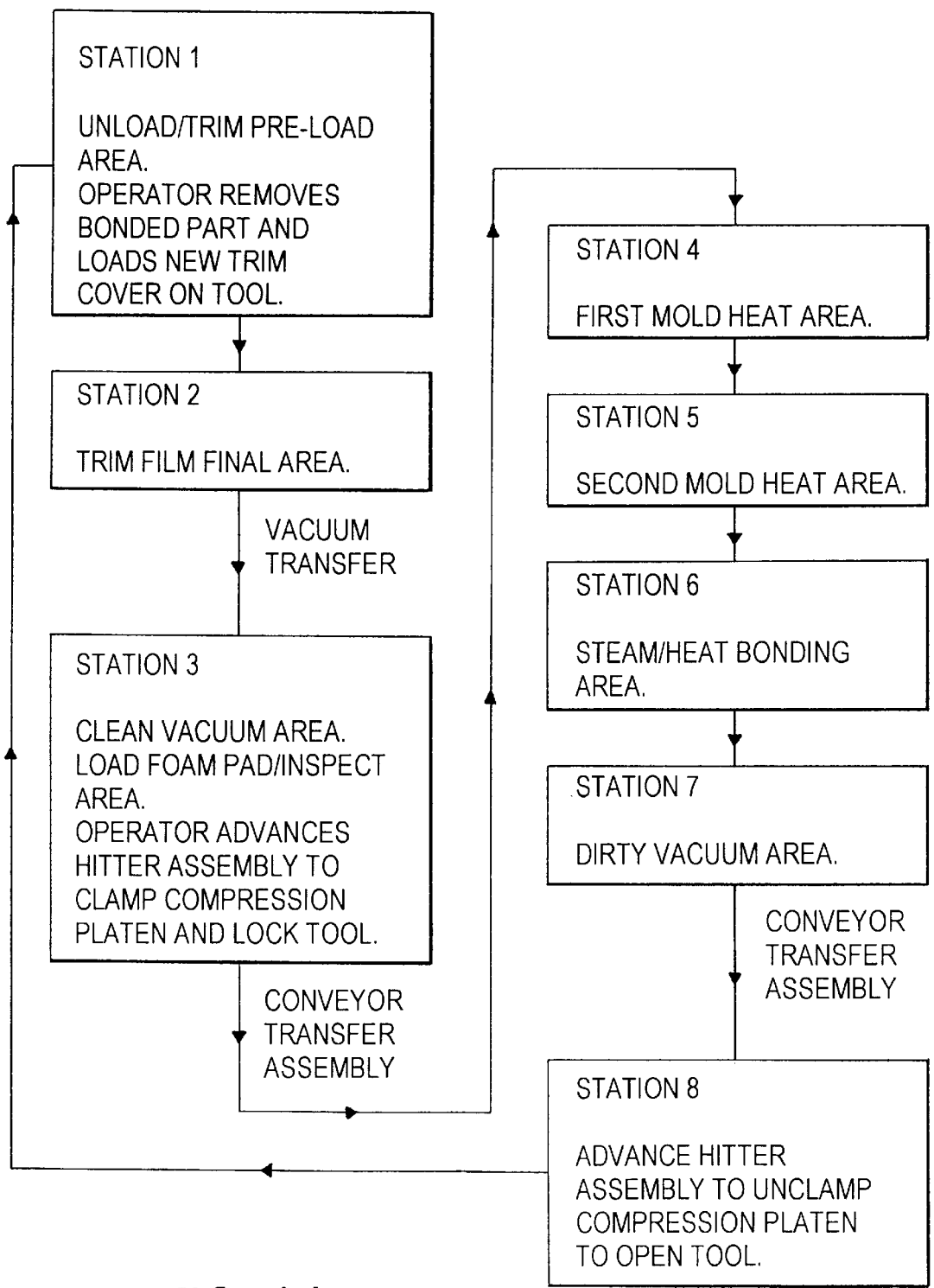
FIG. 14 is a flow diagram of the process for bonding a trim cover to a foam pad along the assembly line.

Referring to FIGS. 1 and 14, the stations along the first 12 and second 14 conveyor lines are shown schematically and in a flow diagram depicting the process of bonding the trim cover 93 to the foam pad 95 according to the preferred embodiment. The first step in the method or process for bonding the trim cover 93 to the foam pad 95 along the assembly lines 12, 14 includes transferring one of the several tool carriers 24 to station 1 shown in FIG. 1. The first locator 30a is powered or activated to move the piston 36 vertically from the cylinder 37 and raise the bumper plate 38 from the lowered position to the raised position extending partially above the surface of the rollers 20 to engage the front edge of the lower support plate 60 and to stop and locate the tool carrier 24 in the first station. In station 1, the press platen 86 is in the open position with the upper mold assemblies 106, 108 spaced above the lower mold assemblies 66, 68. An operator now places a trim cover 93 generally made of upholstery cloth fabric, leather or vinyl face down on each of the upper mold surfaces 74, 82 and aligns the trim cover 93 to conform to the configuration of the mold surfaces 74, 82.

Thereafter, the first locator 30a is again actuated to move the piston 36 downwardly and lower the bumper plate 38 below the rollers 20. The conveyor line 12 is turn on to transfer the tool carrier 24 to the next stage, station 2. Once at the station 2, the second locator 30b engages, stops and locates the tool carrier 24 in the station 2 position. In this position, a vacuum transfer assembly 164 connects with one of the vacuum inlet connectors 128, 130 to provide vacuum pressure to each of the mold assemblies 66, 68.

Figure 9:
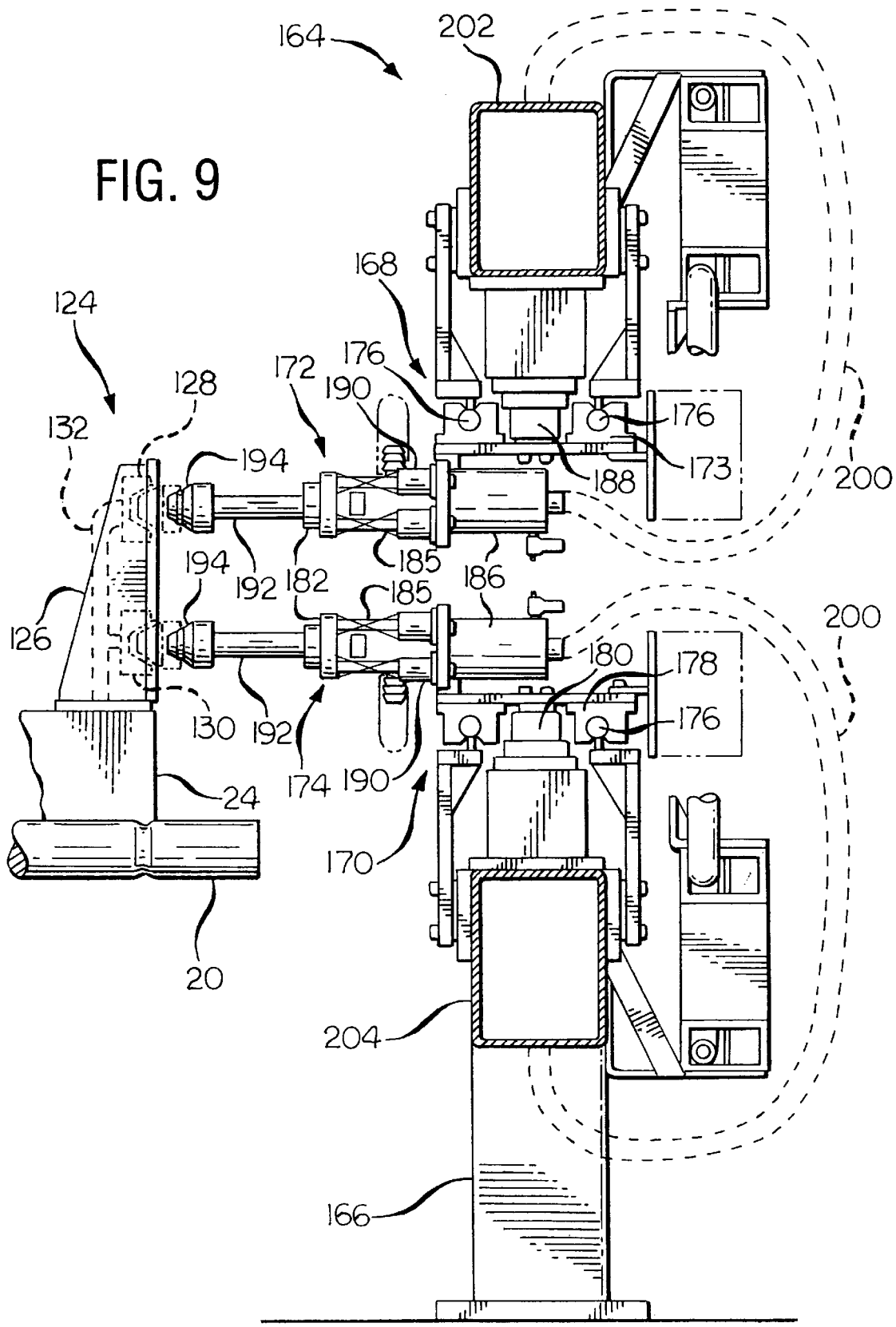
FIG. 9 is a fragmentary end view of the vacuum assembly and connectors.

Referring to FIGS. 8–10, the vacuum transfer assembly 164 includes a support frame 166 secured to the assembly floor 34 and extending longitudinally between first and second ends adjacent to a portion of the first conveyor line 12 along the back side or rear of the tool carriers 24. The support frame 166 carries an upper 168 and lower track 170 for slidably supporting a moveable vacuum connecting box 172, 174 on each track 168, 170. Each track 168, 170 comprises a pair of spaced apart slide rods 176 extending longitudinally along the support frame 166. Each of the vacuum connecting boxes 172, 174 include a pair of collar sleeves 178 having a generally cylindrical opening slidably received and supported by the pair of slide rods 176. An air cylinder 180 further connects each of the vacuum connecting boxes 172, 174 to the respective upper 168 and lower 170 tracks to transfer each connecting box 172, 174 longitudinally along the support frame 166 between the first and second ends. The air cylinder 180 is a mechanical joint rodless cylinder available from SMC in Clinton Township, Mich. Each pair of collar sleeves 178 support a vacuum head 182 thereon which travels with the collar sleeves 178 along the longitudinal length of the upper and lower track slide rods 176. The vacuum head 182 includes a housing 184 for supporting a pneumatic or hydraulic piston 185 and cylinder 186 which is actuatable in a direction transverse to the longitudinal axis of the tracks 168, 170 to extend the piston 185 from a retracted position spaced behind the tool carrier 24 to an extended position with the piston 185 engaging the tool carrier 24. More specifically, the housing 184 includes a plurality of electric solenoids 190 connected to a power source for actuating the piston 185 and cylinder 186. The distal end of the piston 185 includes a snorkel head 192 having a tapered collet 194 which is configured to be matingly received in one of the vacuum inlet connectors 128, 130 on the tool carrier 24. The housing 184 further includes a pair of spaced apart stabilizing arms 196, 198 extending parallel on opposite sides of the snorkel head 192 for guiding and engaging the sides of the support plate 126 which houses the vacuum inlet connectors 128, 130. A vacuum fluid line 200 is interconnected between the housing 184 of the vacuum head 182 and a respective upper or lower vacuum chamber 202, 204 supported by the vacuum support frame. A main vacuum provides vacuum pressure to the upper and lower vacuum chamber for use in creating vacuum pressure in the tool carrier 24.

In operation, when a tool carrier 24 is located at station 2, the controller automatically aligns one of the vacuum heads 182 along the upper 168 or lower 170 tracks at the first end of the support frame 166. The solenoid 190 is actuated to extend the piston 189 and thus the snorkel head 192 from the retracted position to the extended position. The tapered collet 194 of the snorkel head 192 is received in the tapered inlet of one of the upper or lower vacuum inlet connector 128, 130 to engage the vacuum head 182 with the tool carrier 24. The main vacuum is actuated to provide vacuum pressure through the vacuum fluid line 200 and to each of the upper mold surfaces 74, 82 of the mold assemblies 66, 68.

At this stage the operator may adjust the trim cover 93 and then load an air impervious adhesive film 206 on each of the upper mold surfaces 74, 82. The adhesive film 206 may be any type commonly known in the art. The vacuum urges the air impervious adhesive film 206 against the trim cover 93 and mold surfaces 74,82. The operator configures the trim cover 93 and adhesive film 206 on the upper mold surfaces 74, 82 to provide for proper alignment on the molds 66, 68 and remove any wrinkles in the cover 93. The operator may also close the vacuum by closing one of the valve levers 136 to close the fluid line 132 in the tool carrier 24 to either of the lower molds 72, 80. Once the trim cover 93 is sufficiently adjusted, the second locator 30b is lowered and the conveyor line 12 is again actuated to transfer the tool carrier 24 to the next station, that is station 3.

The vacuum transfer assembly 164 extends from the location of station 2 to the location of station 3. It is important to maintain the vacuum pressure in the upper mold surfaces 74, 82 to maintain the proper positioning of the trim cover 93 and film 206, therefore, the vacuum head 182 transfers along the upper 168 or lower 170 track with the tool carrier 24 from station 2 to station 3.

The vacuum heads 182 on the upper 168 and lower 170 tracks travel in opposite intervals or directions along the tracks 168, 170. That is, when the upper vacuum head 182 travels with the tool carrier 24 from station 2 to station 3, the lower vacuum head 182 returns from station 3 to station 2 to reengage with the next consecutive tool carrier 24. The air cylinder 180 is pressurized by the controller to move the vacuum head 182 along the upper 168 or lower 170 track with the tool carrier 24 between stations 2 and 3.

The tool carrier 24 is again engaged and stopped by a locator 30c in station 3 and aligned with an overhead striker assembly 208. The striker assembly 208 provides closing and opening of the upper press platen 86 on the tool carrier 24 between the open position and the closed position. The striker assembly 208 is suspended directly above the tool carrier 24 and conveyor line 12 either by the ceiling or a frame structure. The striker assembly 208 includes a support frame 210 for supporting a piston 212 and cylinder 214 operated by a pneumatic power source and a plurality of guide rods 216 supported by guide collars 218. A striker plate 220 is secured to the distal ends of the piston 212 and each of the guide rods 216. The striker plate 220 includes a pair of forwardly extending arms 222 above the surface of the press platen and oppositely extending arms 224 extending outwardly from the striker plate 220 and perpendicular to the forward extending arms 222. The forwardly extending arms 222 each support a rotating wheel 226 which engages the top surface of the press platen 86 on the tool carrier 24. Each of the outwardly extending arms 224 supports a solenoid 228 for actuating a cylinder assembly 230 between a retracted and extended position. Each of the cylinders 230 houses an extendable piston 232 having a vertical plate 234 on the end thereof.

In operation, once the tool carrier 24 is stopped at station 3, the striker assembly 208 is lowered by the piston 212 and cylinder 214 until the wheels 226 engage the top surface of the press platen 86. The striker plate 220 continues to travel downwardly with the wheels 226 pressing the press platen 86 to rotate about the pivot rod 94 between the collars 92 against the biasing force of the torsion bars 98 and cam lobes 100 until the press platen 86 reaches a horizontal position abutting a pair of abutments 236 on the collars 92. At this stage, the striker plate 220 continues to travel downwardly moving the press platen 86 vertically along the slide rods 90 to the closed position and compressing the upper molds 106, 108 against the foam pad 95. Additionally, as the press platen 86 engages the hooks 114, the side edges contact the cam surfaces 122 on the hooks 114 and rotate the hooks 114 away from the edges of the press platen 86. Once the platen 86 passes the lip 120 of the hooks 114, the spring 116 urges the hooks 114 over the top surface of the platen 86 to lock the platen 86 in the closed position compressing the foam pad 95 against the trim cover 93 on the lower mold assemblies 72, 80.

Finally, the striker plate 220 is raised to the upper position, the locator 30c is moved to the lower position and the conveyor 12 is actuated to transfer the tool carrier 24 to the end of the first conveyor line 12. A blocking plate 238 stops the tool carrier 24 along the transfer assembly 52 which raises to lift the tool carrier 24 and transfer the carrier 24 transversely from the first conveyor line 12 to the second conveyor line 14. The second conveyor line 14 moves in a direction opposite to the first conveyor line 12 and transfers the tool carrier 24 to station 4.

Figure 12:
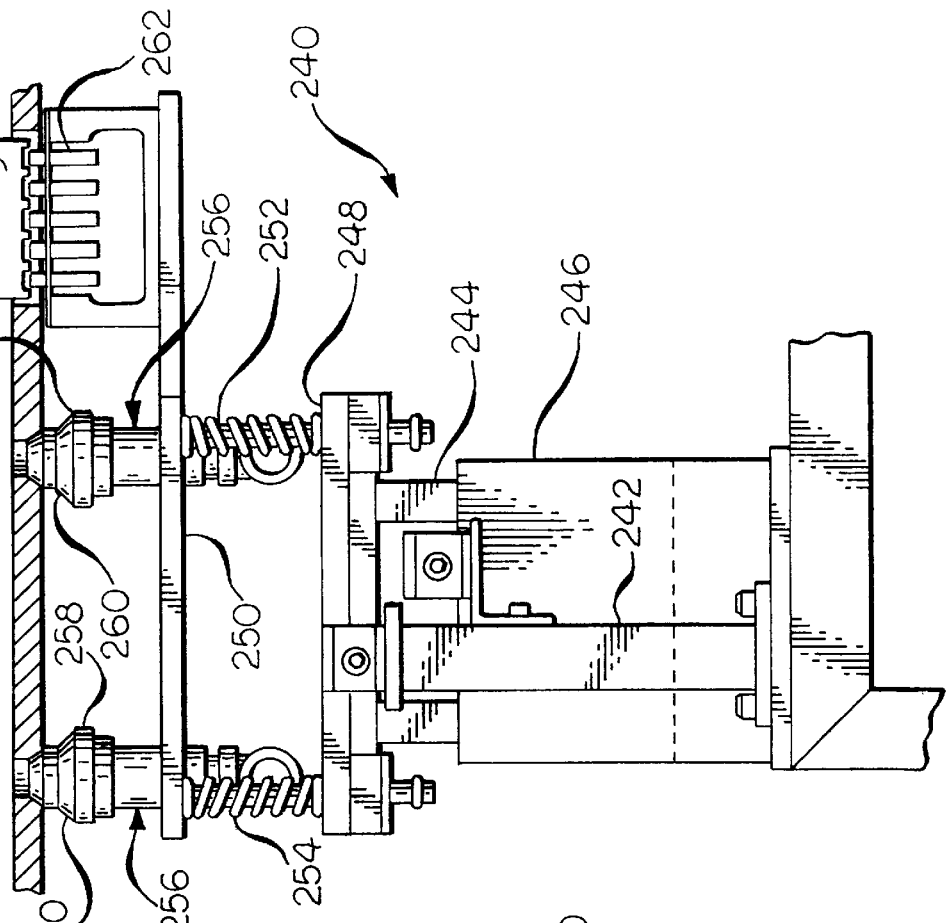
FIG. 12 is a side view of the heat assembly and temperature sensors.

Once the forth locator 30d engages and stops the tool carrier 24 in station 4, the heating cycle of the mold assemblies 66, 68 is initiated. Referring to FIG. 12, a heat assembly 240 is located under the conveyor line 14 and rollers 20 and aligned with the center of the tool carrier 24 beneath the lower support plate 60. The heat assembly 240 includes a support base 242 mounted to the floor 34 for supporting a piston 244 and cylinder 246 assembly. The distal end of the piston 244 supports a table 248 in a horizontal position. A secondary table 250 is supported above the first table 248 by a plurality of support rods 252 and coil springs 254. The secondary table 250 supports a pair of spaced apart heat snorkels 256 similar to the vacuum snorkels 192. Each of the heat snorkels 256 includes a head 258 having a tapered collet 260 for engaging the heated fluid connectors 138, 140 in the lower support plate 60 of the tool carrier 24. A heated fluid line is connected between each of the heat snorkels 256 and a heat source, such as a boiler, for providing heat fluid such as steam or hot air through the snorkels 256 and into the mold assemblies 66, 68.

In operation, once the tool carrier 24 is located at station 4, the cylinder 246 of the heat assembly 240 is actuated to raise the piston 244 and pair of heat snorkels 256 above an adjacent pair of conveyor rollers 20 until the tapered collet 260 of each heat snorkel 296 is received in the opening of the respective heated fluid connectors 138, 140. The heated fluid is then circulated through the fluid lines and out of the passages 76, 84 in the upper mold surfaces 74, 82 of each mold assembly 66, 68.

The secondary table 250 further supports a plurality of male heat sensor probes 262 which also are raised by the piston 244 above the rollers 20 and contact a corresponding plurality of female heat sensor probes 264 on the lower support plate 60 of the tool carrier 24. The female probes 264 are connected via wires and thermocouples to the upper mold surfaces 74, 82 to monitor the heat temperature of the mold surface 74, 82 for proper bonding temperatures. Once the mold assemblies 66, 68 are cycled with the heated fluid for approximately 30 seconds at 210–220 degrees farenheit, the heat is discontinued and the heat snorkels 296 are lowered out of engagement with the tool carrier 24 by the piston 244 and cylinder 246. The forth locator 30d is lowered and the conveyor line 14 is again actuated to transfer the tool carrier 24 to the next stage in the bonding process, that is station 5.

The process at station 5 is repetitive to the process at station 4 and provides the heat assembly 240 for cycling heated fluid through the mold assemblies 66, 68 to heat the upper mold surfaces 74, 82 to the proper bonding temperature. These repetitive stages are necessary to raise the temperature of the mold assemblies 66, 68 to the proper bonding temperature while continuing to transfer a plurality of tool carriers 24 along the conveyor lines 12, 14 to increase volume and productivity levels. If the tool carrier 24 was retained at only one heat station for the entire time required to obtain the proper bonding temperature, the conveyor line 12, 14 would be slowed and production volumes reduced.

Once the heated fluid is cycled for an additional approximate 30 seconds at 210–220 degree farenheit at station 5, the heat snorkels 256 are again disengaged from the heated fluid connectors 138, 140, the locator 30e is lowered and the conveyor 14 is activated to transfer the tool carrier 24 to station 6.

Station 6 is also similar to stations 4 and 5. The process at station 6 again includes raising a locator 30f to engage, stop and locate the tool carrier 24 in the predetermined position. The heat assembly 240 is actuated to raise the heat snorkels 256 into engagement with the heated fluid connectors 138, 140. However, at this time, superheated steam at a temperature of approximately 400 degrees farenheit, pressurized to approximately 2–6 psi, is passed through the snorkels 256 and heated fluid lines to pass through the passages 76, 84 in the upper mold surfaces 74, 82 to melt the adhesive film 206 between the trim cover 93 and foam pad 95. The steam is cycled for approximately 30 seconds to ensure through melting of the adhesive 206. After the cycle time ends, the snorkels 256 are disengaged from the connectors 138, 140, the locator 30f is lowered and the conveyor 14 is again activated to transfer the tool carrier 24 to the next station, that is station 7.

Figure 11:
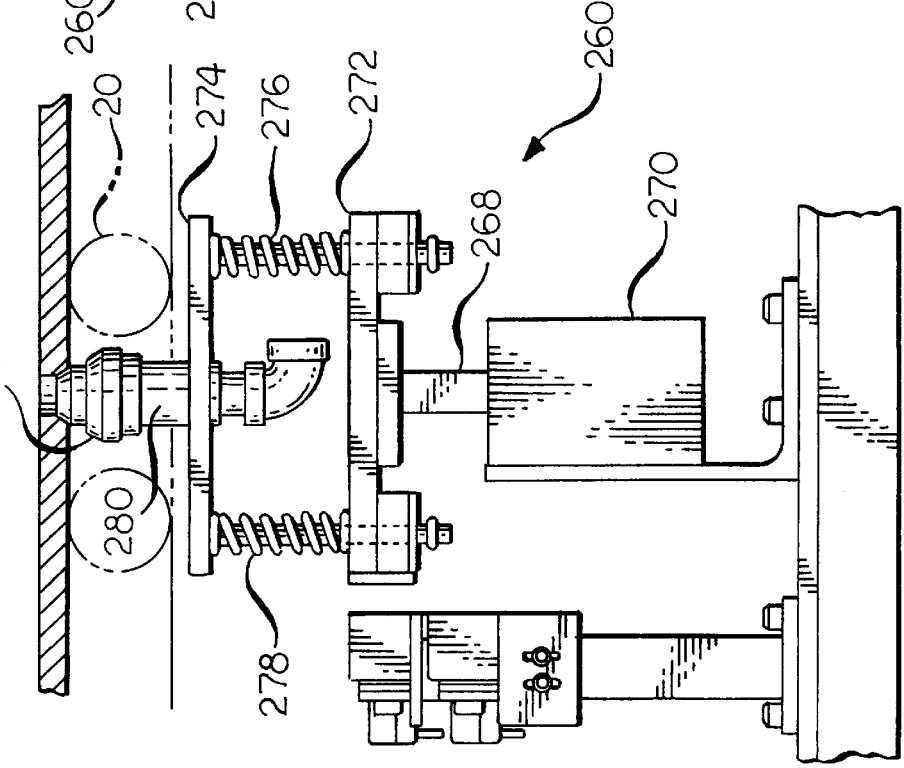
FIG. 11 is a front view of the dirty vacuum assembly and snorkel.

A second vacuum process, referred to as dirty vacuum, occurs at station 7. The second vacuum process includes a dirty vacuum assembly 266 mounted below the conveyor line 14. As shown in FIG. 11, the dirty vacuum assembly 266 is similar to the heat assembly 240 and includes a piston 268 and cylinder 270 for elevating a table 272 mounted on the distal end of the piston 268. A secondary table 274 is connected to and above the first table 272 by support rods 276 and coil springs 278. The secondary table supports a vertically mounted vacuum snorkel 280 having a tapered collet 282 on the end thereof. The piston 268 elevates the snorkel 280 and collet 282 from a lower position spaced below the rollers 20 of the conveyor line 14 to a raised position extending partially above the rollers 20 to engage with the dirty vacuum connector 142 seated in the lower support plate 60 on the tool carrier 24. The collet 282 presses the seated blocking valve 158 upwardly against the biasing force of the springs 160 to open the dirty vacuum passageways 162 to the tool 24. The controller activates a vacuum source to provide vacuum pressure through the dirty vacuum lines 146 to create a vacuum or suction of the heat through the passages 76, 84 in the upper mold surfaces 74, 82 and away from the bond line between the trim cover 93 and foam pad 95. The dirty vacuum 266 is cycled for approximately 30 seconds. At the end of the cycle, the piston 268 is lowered and the snorkel 280 is retracted and disengaged from the female connector 142 and below the rollers 20 of the conveyor line 14. The locator 30f is again lowered and the conveyor line 14 actuated to transfer the tool carrier 24 to the end of the second conveyor line 14 and onto the second transfer assembly 52.

A locator 30h engages, stops and locates the tool carrier 24 on the transfer assembly 52. The tracks 56 are elevated by the piston and cylinder assembly 58 to raise the tool carrier 24 above the rollers 20 on the conveyor line 14 and transfer the carrier 24 across to the first conveyor line 12. The transfer assembly 52 is then lowered below the rollers 20 and the first conveyor line 12 transfers the tool carrier to the last station, that is station 8.

In station 8, a final locator 30i raises to engage, stop and locate the tool carrier 24 under a second striker assembly 208. The controller automatically actuates the striker assembly 208 to lower the piston 212 and striker plate 220 to the press platen 86. The wheels 226 on the striker plate 220 engage the upper surface of the press platen 86 and the solenoids 228 are actuated to extend the plates 234 outwardly into engagement with the hooks 114 on the tool carrier 24. The plates 234 press the hooks 114 outwardly out of engagement with the press platen 86. The striker plate 220 is now raised by the piston 212 with the plates 234 maintaining the hooks 114 spaced outwardly from the edges of the press platen 86 until the platen 86 raised vertically above the lip 120 of the hooks 114. The wheels 226 maintain rolling engagement with the press platen 86 while the nitrogen gas piston and cylinders 102 elevate the platen 86 vertically. Additionally, once the press platen 86 has reach the horizontal position by the nitrogen piston and cylinders 102, the torsion bars 98 and mating cams 100 of the pivot rod 94 rotate and thus pivot the press platen 86 to the final open position. The wheels 226 maintain contact with the press platen 86 during the pivotal movement to provide controlled movement of the platen 86 from the closed position to the open position. Once the tool carrier 24 is unlocked and the press platen 86 raised to the open position, the locator 30i is lowered and the conveyor 12 activated to transfer the tool carrier 24 to the first station, station 1, and the complete bonded seat assembly may be removed from the tool carrier 24 and the process initiated as previous described.

What is claimed is:

1. A tool carrier assembly for use in bonding a trim cover to a cellular foam pad while traveling along an assembly conveyor line, comprising:

an assembly conveyor line with a tool carrier assembly supported thereon;

said tool carrier assembly comprising:

a support plate for supporting at least one mold assembly; said at least one mold assembly including a contoured upper mold surface for supporting the trim cover and foam pad and a mold support platen secured to said support plate for supporting a contoured mold defining said upper mold surface, said upper mold surface including a plurality of passages for providing fluid passageway through said mold;

a press platen supported by said support plate above said mold assembly for compressing the foam pad against the trim cover and said upper mold surface;

a collar assembly for pivotally supporting said press platen and providing pivotal movement of said press platen between an open position spaced at a predetermined inclined angle above said mold assembly and a generally horizontal position adjacent said upper mold surface;

at least one slide rod extending generally vertically from said support plate and slidably coupled to said press platen for providing vertical movement of said press platen from said horizontal position to a closed position compressing the foam pad against the trim cover and upper mold surface; and at least one vacuum connector supported by said support plate and coupled to said mold assembly by a vacuum fluid line, wherein said at least one vacuum connector is capable of creating vacuum pressure in said mold assembly through passages in said upper mold surface as said tool carrier assembly travels along said assembly conveyor line.

2. An assembly as set forth in claim 1 further including a pivot rod interconnecting said press platen and said collar assembly for providing pivotal movement of said press platen between said open position and said horizontal position.

3. An assembly as set forth in claim 2 wherein said pivot rod supports at least one torsion bar for engaging said press platen and urging said press platen to said open position.

4. An assembly as set forth in claim 3 further including a locking mechanism supported by said lower support plate having at least one hook member for engaging and locking said press platen in said closed position compressing said foam pad against said trim cover and upper mold surface.

5. An assembly as set forth in claim 4 further including a lift mechanism supporting on said support plate below said collar assembly for engaging and automatically lifting said collar assembly and said press platen from said closed position to said horizontal position.

6. An assembly as set forth in claim 5 further including a blocking member supported on said support plate below said collar assembly for engaging and stopping the vertical movement of said collar assembly and said press platen in said closed position.

7. An assembly as set forth in claim 6 further including an abutment member fixedly supported on said collar assembly for engaging and stopping said pivotal movement of said press platen from said open position to said horizontal position.

8. An assembly as set forth in claim 1 further including at least one heated fluid connector seated in said support plate and coupled to said mold assembly by a fluid line for passing heated fluid to said mold assembly and said passages in said upper mold surface.

9. An assembly for use in bonding a trim cover to a cellular foam pad comprising:

a tool carrier including a support plate for supporting at least one mold assembly; said mold assembly having a contoured upper mold surface for supporting the trim cover and a foam pad;

a press platen supported by said support plate above said mold assembly for compressing the foam pad against the trim cover and said upper mold surface;

a collar assembly for pivotally supporting said press platen and providing pivotal movement of said press platen between an open position spaced at a predetermined inclined angle above said mold assembly and a generally horizontal position adjacent said upper mold surface;

at least one slide rod extending generally vertically from said support plate and slidably coupled to said press platen for providing vertical movement of said press platen from said horizontal position to a closed position compressing the foam pad against the trim cover and said upper mold surface;

a conveyor line having a plurality of driven rollers for supporting and transporting said tool carrier between one of several assembly stations; and a striker assembly positioned above said tool carrier in one of said assembly stations, said striker assembly including a cylinder assembly supporting a striker plate for providing movement of said striker plate between a raised position spaced above the tool carrier and a lowered position engaging the press platen and moving said press platen from said open position to said closed position wherein said striker plate pivots said press platen from said open position to said horizontal position and extends downwardly to slide said collar assembly along said slide to move said press platen from said horizontal position to said closed position, and wherein said striker plate includes at least one forwardly extending arm supporting a rotating wheel from engaging said press platen and traveling along said press platen upon pivotal movement from said open position to said horizontal position.

10. An assembly as set forth in claim 9 wherein said wheel and said striker plate engage said press platen in said horizontal position to vertically move said press platen from said horizontal position to said closed position.

11. An assembly as set forth in claim 9 wherein said tool carrier includes a pivot rod interconnecting said press platen and said collar assembly for providing pivotal movement of said press platen between said open position and said horizontal position.

12. An assembly as set forth in claim 11 wherein said pivot rod supports at least one torsion bar from engaging said press platen and urging said press platen to said open position.

13. An assembly as set forth in claim 9 wherein said tool carrier includes a locking mechanism supported by said support plate and having at least one hook member for engaging and locking said press platen in said closed position compressing the foam pad against the trim cover and upper mold surface.

14. An assembly as set forth in claim 13 wherein said striker plate includes at least one outwardly extending arm having a plate movable between a retracted position spaced inwardly of said hook member and an extended position engaging and extending said hook member away from said press platen to unlock said press platen in said closed position for movement to said horizontal position.

15. An assembly as set forth in claim 9 wherein said tool carrier further includes a lift mechanism supporting on said support plate below said collar assembly for engaging and automatically lifting said collar assembly and said press platen from said closed position to said horizontal position.

16. An assembly as set forth in claim 9 wherein said tool carrier further includes a blocking member supported on said support plate below said collar assembly for engaging and stopping the vertical movement of said collar assembly and said press platen in said closed position.

17. An assembly as set forth in claim 9 wherein said tool carrier further includes an abutment member fixedly supported on said collar assembly for engaging and stopping said pivotal movement of said press platen from said open position to said horizontal position.

18. An assembly as set forth in claim 9 wherein said mold assembly includes a mold support platen secured to said support plate for supporting a contoured mold defining said upper mold surface.

19. An assembly as set forth in claim 9 wherein said upper mold surface includes a plurality of passages for providing fluid passageway through said mold.

20. An assembly as set forth in claim 19 wherein said tool carrier further includes at least one heated fluid connector seated in said support plate and coupled to said mold assembly by a fluid line for passing heated fluid to said mold assembly and said passages in said upper mold surface.

21. An assembly as set forth in claim 20 wherein said tool carrier further includes at least one vacuum connector supported by said support plate and coupled to said mold assembly by a vacuum fluid line for creating vacuum pressure in said mold assembly through said passages in said upper mold surface.

22. An assembly as set forth in claim 9 wherein said assembly further includes a locator assembly mounted below said conveyor line and said roller, said locator assembly including a bumper plate movable between a lowered position spaced below said rollers and a raised position extending at least above said roller for engaging, stopping and locating said tool carrier along said conveyor line in one of said assembly stations.

23. An assembly as set forth in claim 22 wherein said locator assembly includes a base member pivotally supporting said bumper plate and a piston and cylinder assembly for pivoting said bumper plate between said lowered and raised positions.

24. An assembly as set forth in claim 9 wherein said assembly further includes a vacuum source assembly having a support frame for supporting at least one vacuum chamber extending longitudinally between first and second ends along a portion of said conveyor line between at least two consecutively adjacent assembly stations.

25. An assembly as set forth in claim 24 wherein said vacuum source assembly includes a vacuum connecting box coupled to said frame between said first and second ends, said vacuum box including a vacuum head mounted to said box by a piston and cylinder assembly and movable between a retracted position spaced from said tool carrier and an extended position with said vacuum head engaging said vacuum inlet connector to provide pressure from said chamber to said mold assembly.

26. An assembly as set forth in claim 25 wherein said vacuum source assembly includes a track for slidably mounting said vacuum connecting box to said frame between said first and second ends for transferring said connecting box with said tool carrier between said adjacent assembly station while maintain said engagement and vacuum pressure between said vacuum head and said inlet connector.

27. An assembly as set forth in claim 9 wherein said assembly further includes a heat assembly mounted below said conveyor line and said rollers for engaging said heated fluid connector and providing heated fluid to said mold assembly.

28. An assembly as set forth in claim 27 wherein said heat assembly includes at least one heat snorkel mounted to a piston and cylinder assembly and moveable between a retracted position spaced below said rollers and said tool carrier and an extended position raised partially above said rollers and received to engage said heated fluid connector.

29. An assembly as set forth in claim 28 wherein heat assembly further includes a heat sensor probe moveable with said heat snorkel to connect with said tool carrier and measure the temperature of said mold assembly at said upper mold surface.

30. An assembly as set forth in claim 29 wherein said heat assembly includes a main heat source coupled to said heat snorkel for providing heated fluid through said snorkel to said upper mold surface.

31. An assembly as set forth in claim 30 wherein said assembly includes a dirty vacuum assembly mounted below said conveyor line and said rollers for engaging said tool carrier and provide vacuum pressure to said mold assembly for drawing said heated fluid from said mold.

32. An assembly as set forth in claim 31 wherein said dirty vacuum assembly includes a vacuum snorkel mounted to a piston and cylinder and moveable from a retracted position spaced below said rollers and an extended position extending at least partially above said rollers for engaging said dirty vacuum connector and provide said vacuum pressure to said mold assembly.

33. An assembly as set forth in claim 9 wherein said assembly includes a pair of longitudinally extending parallel first and second conveyor lines for transferring said tool carrier between said plurality of assembly stations.

34. An assembly as set forth in claim 9 further including a transfer assembly extending transversely between said first and second conveyor lines, said transfer assembly including at least one track rotatable in a direction transverse to said rotation direction of at least one roller, said track mounted below said conveyor lines and moveable between a lowered position spaced below the rollers of each conveyor line and a raised position extending at least partial above said at least one roller to lift and transfer said tool carrier from one of said conveyor line to said other conveyor line.

35. An assembly as set forth in claim 9 further including a controller and a pedal for automatically controlling said movement of said assembly at selective positions and said assembly stations.

36. A process of fabricating a cushion assembly by bonding a trim cover to a cellular foam pad between a plurality of stations along a conveyor assembly line, the process comprising the steps of:

provviding a conveyor line having a plurality of rotating rollers for supporting and transferring a tool carrier along the conveyor line;

locating the tool carrier at a first station and loading a trim cover onto the upper mold surface of a mold assembly supported by the tool carrier;

transferring the tool carrier along the conveyor line to a second station;

placing an air impervious adhesive film over the trim cover;

connecting a vacuum source with the tool carrier and applying vacuum pressure over the upper mold surface to draw the adhesive film down against the trim cover and to urge the trim cover against the mold surface;

transferring the tool carrier along the conveyor line to a third station and maintaining the vacuum pressure into the mold surface continuously from the second to the third station;

placing a cellular foam pad in facing engagement with the adhesive film;

engaging a press platen mounted above the mold assembly and compressing the foam pad against the adhesive film, trim cover and upper mold surface;

heating and diffusing the adhesive film into the foam pad and trim cover and curing the diffused adhesive to secure the trim cover to the foam pad;

locking the press platen in a closed position to maintain the foam pad compressed against the adhesive film, trim cover and upper mold surface; and disconnecting the vacuum source from the tool carrier after the press platen is locked in the closed position and transferring the vacuum source from the third station to the second station for engagement with the next tool carrier on the assembly line.

37. A process as set forth in claim 36 further including transferring the tool carrier to a fourth station along the conveyor line and engaging a first heat assembly with the tool carrier to heat the mold assembly.

38. A process as set forth in claim 37 further including transferring the tool carrier to a fifth station along the conveyor line and engaging a second heat assembly with the tool carrier to provide additional heat to the mold assembly.

39. A process as set forth in claim 38 further including transferring the tool carrier to a sixth station along the conveyor line and engaging a third heat assembly with the tool carrier to inject pressurized steam through the upper mold surface and diffuse the adhesive film into the foam pad and trim cover.

40. A process as set forth in claim 38 further including transferring the tool carrier to a sixth station along the conveyor line and engaging a third heat assembly with the tool carrier to inject pressurized hot air through the upper mold surface and diffuse the adhesive film into the foam pad and trim cover.

41. A process as set forth in claim 39 further including transferring the tool carrier to a seventh station along the conveyor line and engaging a second vacuum assembly with the tool carrier, applying a second vacuum pressure over the mold surface after the adhesive film has been heated to remove the heat from the bond line between the trim cover and foam pad and curing the diffused adhesive to secure the trim cover to the foam pad.

42. A process as set forth in claim 41 further including transferring the tool carrier to an eighth station, engaging and unlocking the press platen from the closed position and raising the press platen above the mold assembly.

43. A process as set forth in claim 41 further including transferring the tool carrier to the first station and removing the cushion assembly from the mold assembly.

* * * * *